(12) United States Patent
Wang et al.

(10) Patent No.: US 11,496,355 B2
(45) Date of Patent: *Nov. 8, 2022

(54) METHOD FOR PROCESSING FORWARDING DEVICE FAULT, DEVICE, AND CONTROLLER

(71) Applicant: Huawei Technologies Co., Ltd., Shenzhen (CN)

(72) Inventors: Zhongyu Wang, Nanjing (CN); Peilin Yang, Shenzhen (CN); Wenxiong Zhu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 129 days.

This patent is subject to a terminal disclaimer.

(21) Appl. No.: 16/931,708

(22) Filed: Jul. 17, 2020

(65) Prior Publication Data

US 2021/0006454 A1    Jan. 7, 2021

Related U.S. Application Data

(63) Continuation of application No. 15/641,027, filed on Jul. 3, 2017, now Pat. No. 10,756,958, which is a
(Continued)

(30) Foreign Application Priority Data

Jan. 5, 2015  (CN) .......................... 201510003991.3

(51) Int. Cl.
*H04L 45/02* (2022.01)
*H04L 41/069* (2022.01)
(Continued)

(52) U.S. Cl.
CPC ........ *H04L 41/069* (2013.01); *H04L 41/0654* (2013.01); *H04L 41/0668* (2013.01);
(Continued)

(58) Field of Classification Search
CPC .............. H04L 41/069; H04L 41/0654; H04L 41/0668; H04L 43/0811; H04L 43/16;
(Continued)

(56) References Cited

U.S. PATENT DOCUMENTS 8,176,526 B1    5/2012  Yang et al.
8,885,463 B1   11/2014  Medved et al.
(Continued)

FOREIGN PATENT DOCUMENTS

CN    103346971 A    10/2013
CN    103795570 A     5/2014
(Continued)

OTHER PUBLICATIONS

Zhan, L. et al, "OpenFlow-based Service Migration Method for Streaming Media Cloud," Computer Engineering, vol. 40, No. 12, Dec. 2014, 5 pages.

*Primary Examiner* — Hoon J Chung
(74) *Attorney, Agent, or Firm* — Slater Matsil, LLP

(57) ABSTRACT

A method for processing a forwarding device fault, a device, and a controller are provided, and relate to the communications field. The method is as follows. An SNC receives a notification message sent by a first forwarding device, where the notification message includes a fault parameter of the first forwarding device, and the fault parameter includes a device identifier of the first forwarding device, a port identifier of a degraded port, and a degradation value of the port identified by the port identifier. The SNC determines, according to the device identifier and the port identifier, at least one forwarding path that passes through the port identified by the port identifier. The SNC also determines, according to the fault parameter of the first forwarding
(Continued)

Forwarding device (network switch)    Forwarding device (network switch)

device and the fault parameters of other forwarding devices on one forwarding path, whether to update the forwarding path.

16 Claims, 10 Drawing Sheets

Related U.S. Application Data continuation of application No. PCT/CN2016/070159, filed on Jan. 5, 2016.

(51) Int. Cl.
*H04L 41/0654* (2022.01)
*H04L 41/0668* (2022.01)
*H04L 43/0811* (2022.01)
*H04L 43/16* (2022.01)
*H04L 45/28* (2022.01)
*H04L 45/00* (2022.01)
*H04L 45/64* (2022.01)

(52) U.S. Cl.
CPC .......... *H04L 43/0811* (2013.01); *H04L 43/16* (2013.01); *H04L 45/02* (2013.01); *H04L 45/22* (2013.01); *H04L 45/28* (2013.01); *H04L 45/64* (2013.01)

(58) Field of Classification Search
CPC ......... H04L 45/02; H04L 45/22; H04L 45/28; H04L 45/64

See application file for complete search history.

(56) References Cited

U.S. PATENT DOCUMENTS

| | | | |
|---|---|---|---|
| 9,038,151 B1 | 5/2015 | Chua et al. | |
| 10,756,958 B2 * | 8/2020 | Wang | ...................... H04L 43/16 |
| 2005/0111350 A1 | 5/2005 | Kano | |
| 2005/0249123 A1 | 11/2005 | Finn | |
| 2007/0206495 A1 | 9/2007 | Takagi | |
| 2009/0092054 A1 | 4/2009 | Compton et al. | |
| 2014/0280898 A1 | 9/2014 | Voit et al. | |
| 2016/0006601 A1 | 1/2016 | Suzuki | |

FOREIGN PATENT DOCUMENTS

| | | |
|---|---|---|
| CN | 103891204 A | 6/2014 |
| CN | 103986651 A | 8/2014 |
| CN | 104253745 A | 12/2014 |
| WO | 2014129624 A1 | 8/2014 |

* cited by examiner

METHOD FOR PROCESSING FORWARDING DEVICE FAULT, DEVICE, AND CONTROLLER

CROSS-REFERENCE TO RELATED APPLICATIONS

This application is a continuation of U.S. patent application Ser. No. 15/641,027, filed on Jul. 3, 2017, which is a continuation of International Application No. PCT/CN2016/070159, filed on Jan. 5, 2016, which claims priority to Chinese Patent Application No. 201510003991.3, filed on Jan. 5, 2015. All of the aforementioned patent applications are hereby incorporated by reference in their entireties.

TECHNICAL FIELD

The present invention relates to the communications field, and in particular, to a method for processing a forwarding device fault, a device, and a controller.

BACKGROUND

In a conventional network architecture, when a fault occurs on a forwarding device due to a hardware or software problem, for example, a port error code fault, a port error frame fault, a single-fiber fault, and the like on the forwarding device, and fault information needs to be transferred to another device, a protocol packet is usually used for transferring. Therefore, multiple forwarding devices together optimize a packet forwarding path associated with the fault. A commonly used protocol packet is a Bidirectional Forwarding Detection (BFD) protocol, which can implement fast convergence of links and therefore ensure always-on services.

An example of a solution of transferring cyclic redundancy check (CRC) error codes on a port by applying the BFD protocol is used. CRC error code detection is performed on a port of a forwarding device. After a CRC error code is detected on the port, error code information is sent to an ingress node of a forwarding path by using a BFD packet. Multiple forwarding devices on the forwarding path separately calculate a CRC error code. The ingress node summarizes the error codes on a forward forwarding path and calculates an error code rate, to determine whether the error code rate exceeds a preset threshold and further determine whether to trigger the forwarding path and a service switchover. In this process, the BFD packet can reach the ingress node only by passing through the multiple forwarding devices, and therefore a consumed time is long. As a result, services may be interrupted and hardware resources of a BFD system may be occupied.

SUMMARY

Embodiments of the present invention provide a method for processing a forwarding device fault, a device, and a controller, so as to resolve a problem of low efficiency in recalculating a forwarding path caused by time-consuming fault information transfer.

To achieve the foregoing objective, the embodiments of the present invention use the following technical solutions.

According to a first aspect, a method for processing a forwarding device fault is provided. The method includes receiving, by a software-defined networking (SDN) controller, a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier. The method also includes determining, by the SDN controller (SNC) according to the device identifier and the port identifier, at least one forwarding path that passes through the port identified by the port identifier. The method also includes obtaining, by the SNC, fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The method also includes determining, by the SNC according to the fault parameter of the first forwarding device and the fault parameters of the other forwarding devices different from the first forwarding device on the forwarding path, whether to update the forwarding path.

With reference to the first aspect, in a first implementation manner of the first aspect, the determining, by the SNC according to the fault parameter of the first forwarding device and the fault parameters of the other forwarding devices different from the first forwarding device on the forwarding path, whether to update the forwarding path includes: calculating, by the SNC, a total degradation value of ports on the forwarding path according to the degradation value of the port identified by the port identifier of the first forwarding device and the degradation values of the ports, on the forwarding path, of the other forwarding devices; and updating, by the SNC, the first forwarding path if the total degradation value of the ports on the forwarding path is greater than a preset threshold.

With reference to the first aspect or the first implementation manner of the first aspect, in a second implementation manner of the first aspect, the updating, by the SNC, the first forwarding path includes: calculating, by the SNC, an updated first forwarding path, tearing down the first forwarding path, and establishing the updated first forwarding path; or replacing, by the SNC, the first forwarding path with a backup path of the first forwarding path.

With reference to any one of the first aspect, or the first and the second implementation manners of the first aspect, in a third implementation manner of the first aspect, the notification message is an asynchronous message in an OpenFlow (OpenFlow protocol), the notification message includes a type-length-value TLV with a type value of 35, and the TLV includes the fault parameter of the first forwarding device.

According to a second aspect, an SNC is provided. The SNC includes a receiving unit, configured to receive a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier. The SNC also includes a processing unit, configured to determine, according to the device identifier and the port identifier, at least one forwarding path that passes through the port identified by the port identifier. The SNC also includes an obtaining unit, configured to obtain fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The processing unit is further configured to determine, according to the fault parameter of the first forwarding device and the fault parameters of the other forwarding devices different from the first forwarding device on the forwarding path, whether to update the forwarding path.

With reference to the second aspect, in a first implementation manner of the second aspect, the processing unit is configured to: calculate, a total degradation value of ports on the forwarding path according to the degradation value of the port identified by the port identifier of the first forwarding device and the degradation values of the ports, on the forwarding path, of the other forwarding devices; and update the first forwarding path if the total degradation value of the ports on the forwarding path is greater than a preset threshold.

With reference to the second aspect or the first implementation manner of the second aspect, in a second implementation manner of the second aspect, the processing unit is configured to: calculate an updated first forwarding path, tear down the first forwarding path, and establish the updated first forwarding path; or replace the first forwarding path with a backup path of the first forwarding path.

With reference to any one of the second aspect, or the first and the second implementation manners of the second aspect, in a third implementation manner of the second aspect, the notification message is an asynchronous message in an OpenFlow (OpenFlow) protocol, the notification message includes a type-length-value TLV with a type value of 35, and the TLV includes the fault parameter of the first forwarding device.

According to a third aspect, a method for processing a forwarding device fault is provided. The method includes sending, by a forwarding device, a notification message to an SNC, where the notification message includes a fault parameter of the forwarding device, and the fault parameter of the forwarding device includes a device identifier of the forwarding device, a port identifier of a degraded port of the forwarding device, and a degradation value of the port identified by the port identifier. The method also includes receiving, by the forwarding device, a path establishment message sent by the SNC, where the path establishment message includes path information of an updated forwarding path.

With reference to the third aspect, in a first implementation manner of the third aspect, the notification message is an asynchronous message in an OpenFlow (OpenFlow) protocol, the notification message includes a type-length-value TLV with a type value of 35, and the TLV includes the fault parameter of the forwarding device.

According to a fourth aspect, a forwarding device is provided. The device includes a sending unit, configured to send a notification message to a software-defined networking SDN controller SNC, where the notification message includes a fault parameter of the forwarding device, and the fault parameter of the forwarding device includes a device identifier of the forwarding device, a port identifier of a degraded port of the forwarding device, and a degradation value of the port identified by the port identifier. The device also includes a receiving unit, configured to receive a path establishment message sent by the SNC, where the path establishment message includes path information of an updated forwarding path.

With reference to the fourth aspect, in a first implementation manner of the fourth aspect, the notification message is an asynchronous message in an OpenFlow protocol, the notification message includes a type-length-value TLV with a type value of 35, and the TLV includes the fault parameter of the forwarding device.

According to a fifth aspect, a communications system is provided, including the controller SNC according to the second aspect and the forwarding device according to the fourth aspect.

The embodiments of the present invention provide a method for processing a forwarding device fault, a device, and a controller. An SNC receives a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier; determines, according to the device identifier and the port identifier, at least one forwarding path that passes through the port identified by the port identifier; and obtains fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The controller determines, according to the fault parameter of the first forwarding device and the fault parameters of the other forwarding devices different from the first forwarding device on the forwarding path, whether to update the forwarding path. In this way, instead of transferring fault information between forwarding devices in a conventional way, fault information of the forwarding device is notified to the controller, so that the controller calculates an updated forwarding path. This can resolve a problem of low efficiency in recalculating a forwarding path because transferring a fault by the forwarding device causes transfer of fault information to be time consuming.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

According to software-defined networking (English: software-defined networking, SDN), a control plane and a data plane are separated and are implemented by an SDN controller (SNC) and a forwarding device respectively, implementing flexible control of network traffic.

Figure 1:
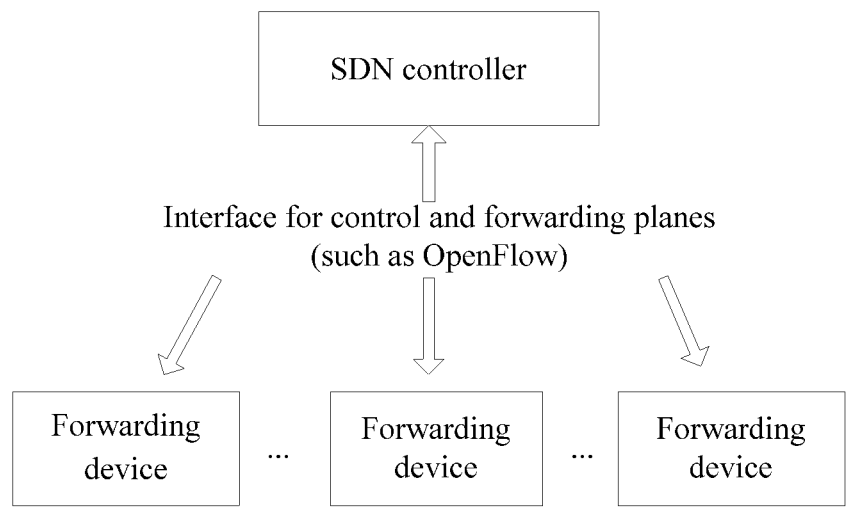
FIG. 1 is an architectural diagram of an SDN network.

In an SDN network, devices can be classified into the SNC and the forwarding device. The forwarding device may be, for example, a network switch. One SNC can control multiple forwarding devices. As shown in FIG. 1, a controller communicates with a forwarding device by using a southbound interface. The southbound interface may be an OpenFlow protocol. The SNC is a control device in the SDN network. The forwarding device is mainly responsible for forwarding a packet according to control information sent by the SNC by using the southbound interface.

Figure 2:
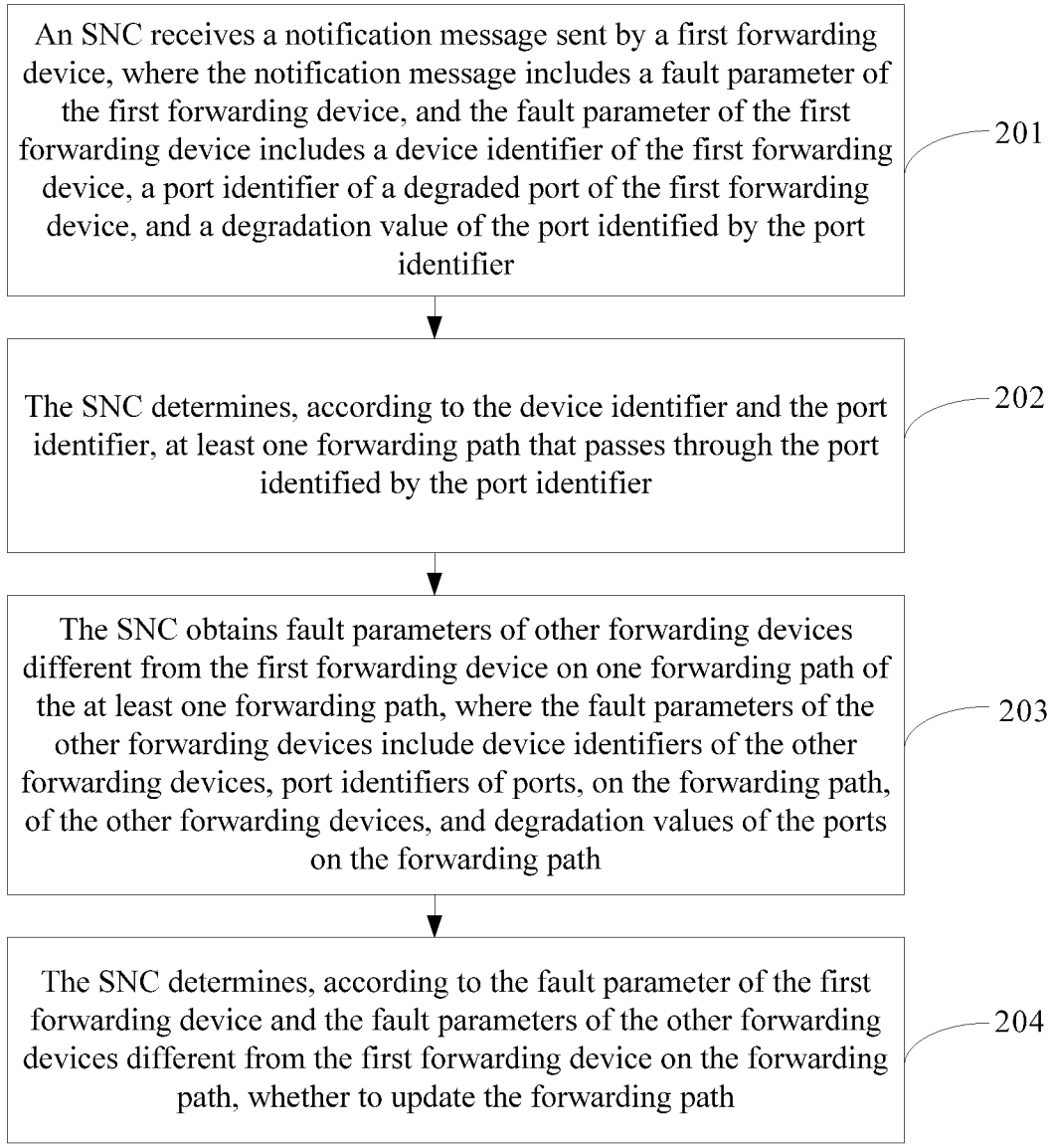
FIG. 2 is a schematic flowchart of a fault information transfer method according to an embodiment of the present invention.

By applying the foregoing network structure, an embodiment of the present invention provides a method for processing a forwarding device fault. As shown in FIG. 2, the method includes the following steps.

201: An SNC receives a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier.

202: The SNC determines, according to the device identifier and the port identifier, at least one forwarding path that passes through the port identified by the port identifier.

203: The SNC obtains fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path.

204: The SNC determines, according to the fault parameter of the first forwarding device and the fault parameters of the other forwarding devices different from the first forwarding device on the forwarding path, whether to update the forwarding path.

The SNC may be a network switch. When detecting a forwarding device fault, the first forwarding device may send the notification message to the controller SNC. The notification message includes the fault parameter of the first forwarding device.

The fault parameter includes the device identifier of the first forwarding device, the port identifier of the degraded port, and the degradation value of the port identified by the port identifier. The degradation value herein may be used to represent a type of the fault occurring on the first forwarding device and a quantized value of the fault. For example, a port error code is generated on the first forwarding device, and a degradation value may be an error code rate of 20%.

Step 201 is for an illustration purpose. In the network structure shown in FIG. 1, if detecting a port error code by means of CRC, a network switch 1 can send a notification message to the SNC. The notification message includes a fault location, a fault status, and a fault parameter of the network switch 1. The fault location may be a device identifier used for identifying the network switch 1, and a port identifier. The fault status may be fault generated. The fault parameter may include a degradation value of a fault generated on a port of the network switch 1, for example, a port error code rate of the port. The port error code may be generated because decay in signal transmission changes a signal voltage, and as a result, a signal is damaged during transmission. In addition, pulses caused by alternating current or lightning, a transmission device fault, or another factor may cause an error code. The error code rate, namely a bit error rate (BER), is an indicator that measures data transmission precision in a specified time. That is, Bit error rate=Quantity of wrongly transmitted bits/Total quantity of transmitted bits.

For another example, a fault of a port frame loss may occur on the network switch. A frame loss rate (FLR) can reflect a performance status existing when the network switch is overloaded. In this case, a fault parameter of a forwarding device may be the frame loss rate, indicating a percentage of frames that cannot be forwarded due to a lack of resources when the network switch is in a continuous loading state. In addition, a single-fiber fault may occur on the network switch. That is, a physical fault occurs on a fiber of a port of the network switch, for example, the fiber is disconnected from the port. In this case, the fault parameter may be a single-fiber fault, and a degradation value of the fault is 0.

Figure 3:
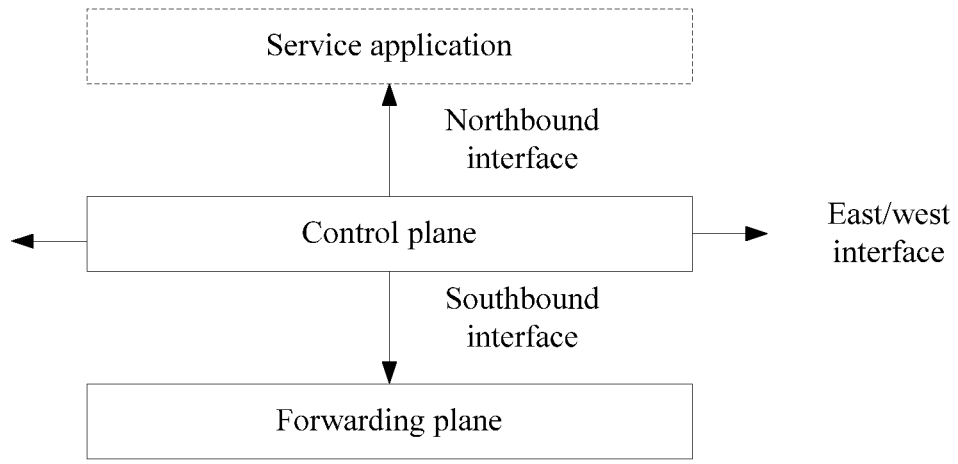
FIG. 3 is a schematic diagram of defining an interface in an SDN network architecture.

Herein, in an SDN network structure, when the control plane and the data plane are separated, a southbound interface and an east/west interface are specified. The interfaces herein are not physical interfaces, and may be understood as protocols. As shown in FIG. 3, the southbound interface is configured for communication between the controller and the forwarding device, that is, between the control plane and the forwarding plane. The east/west interface is used for communication between controllers, that is, for collaboration between control planes. Therefore, with reference to this embodiment of the present invention, when the forwarding device reports the fault parameter to the SNC, the SNC can receive the fault parameter sent by the forwarding device by using the southbound interface.

The fault parameter received by the SNC from the forwarding device may be a fault parameter, sent by the forwarding device by using the OpenFlow protocol, in a type-length-value (TLV) format.

Figure 12:
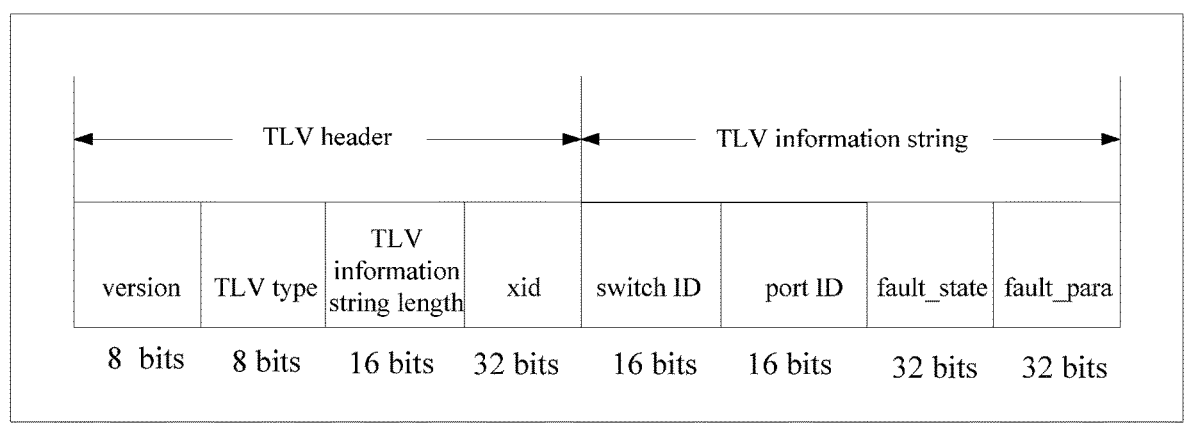
FIG. 12 is a Table 1.

Specifically, the TLV format may be shown in Table 1, depicted in FIG. 12.

According to the TLV format specified in the OpenFlow protocol, a TLV header may include a version number, a TLV type, a TLV information string length, and xid. This embodiment of the present invention provides a TLV. For example, the type may be 35, indicating that TLV information string carries device fault information. The version number indicates a version number of the OpenFlow protocol, for example, OpenFlow 1.4.0; xid indicates a sequence number of a data packet to which the TLV belongs. The TLV information string length indicates a TLV length, which may be 16 bits.

The TLV information string includes a switch identifier and a port identifier of a degraded port, and the SNC can tear down or replace a forwarding path related to a faulty port according to the switch identifier and the port identifier.

Optionally, the TLV information string may also include a fault parameter (fault_para). The fault parameter can be an error code rate, a frame loss rate, or a single-fiber fault. When the fault parameter is the error code rate or the frame loss rate, the fault parameter may be expressed as a percentage or permyriad. The single-fiber fault may be expressed as 0 or another value. Optionally, the TLV information string may also be a fault state (fault_state). The fault state may be 0 or 1, where 1 indicates that a fault occurs, and 0 indicates that a fault is rectified.

Further, in step 202, after the forwarding device sends the fault parameter to the SNC, the SNC can determine, according to the device identifier of the forwarding device and the port identifier of the degraded port, at least one forwarding path that passes through the degraded port, identified by the port identifier, of the forwarding device. The forwarding path refers to a path on which a data packet in a flow is transmitted/forwarded in a network, where the path includes a link on which the data packet enters the network by using a first network switch, a link on which the data packet is transferred out of the network by using an $N^{th}$ switch, links that pass through a second, a third, . . . , and an $(N-1)^{th}$-switches in a process in which the data packet is transferred out from the first network switch to the $N^{th}$ network switch, and links between neighboring switches. In an OpenFlow network, the SNC has device, port, and link information of network switches. A port is a network interface that transfers a data packet between an OpenFlow process and the network. The network switches are interconnected logically by using an OpenFlow port. The SNC maintains a corresponding flow table for each network switch. The flow table consists of multiple flow entries, each flow entry is a forwarding rule, and a data packet that enters a network switch obtains, by querying the flow table, a destination port to which the packet is forwarded. Therefore, when learning a device identifier of a network switch and a port identifier of a degraded port, the SNC can determine, according to the device identifier and the port identifier, at least one forwarding path that passes through the degraded port, identified by the port identifier, of the network switch, that is, determine at least one logical flow entry that is related to the port and that passes through multiple network switches.

Further, after determining the at least one forwarding path on which the degraded port is located, in step 203, the SNC can obtain, according to the at least one forwarding path determined in step 202, fault parameters of other forwarding devices different from the first forwarding device on one forwarding path of the at least one forwarding path. The fault parameters of the other forwarding devices include device identifiers of the other forwarding devices, port identifiers of ports, on the forwarding path, of the other forwarding devices, and degradation values of the ports on the forwarding path.

Further, in step 203, with reference to the fault parameter of the first forwarding device and the fault parameters sent by the other forwarding devices on the forwarding path, the SNC determines whether to update the forwarding path. Specifically, the SNC can calculate, a total degradation value of ports on the forwarding path according to the degradation value of the port identified by the port identifier of the first forwarding device and the degradation values of the ports, on the forwarding path, of the other forwarding devices. If the total degradation value of the ports on the forwarding path is greater than a preset threshold, the SNC updates the first forwarding path.

A first implementation manner of updating the first forwarding path by the SNC includes: The SNC calculates an updated first forwarding path, tears down the first forwarding path, and establishes the updated first forwarding path. A second implementation manner includes: The SNC replaces the first forwarding path with a backup path of the first forwarding path, so as to quickly optimize all fault-related forwarding paths in the network and quickly switch to another normal path. Certainly, other implementation manners may be included, and are not limited in the present invention.

For the first implementation manner, for example, when the fault parameter of the first forwarding device is a port error code rate of a first port of the first forwarding device, assuming that the fault parameters of the other forwarding devices include a port error code rate, sent by a second forwarding device, of a second port that is on a same forwarding path as the first port, the SNC can overlay the port error code rates on the same path. If an overlaid error code rate is greater than the preset threshold, the SNC needs to tear down the same forwarding path, delete a forwarding rule related to the same forwarding path in the SNC, that is, delete a flow entry related to the same forwarding path, and then remake a forwarding rule, that is, re-determine a forwarding path, to quickly switch to another normal path. Further, the SNC sends the new forwarding rule to a forwarding device on the newly established path, so as to ensure that a to-be-forwarded packet is not forwarded on the forwarding path on which the degraded port is located.

For example, the SNC corresponds to four network switches, which are S1, S2, S3, and S4 respectively. S1 is connected to S2, S3, and S4 sequentially. When S1 detects that a port 1 has an error code fault, and an error code rate of the port 1 is greater than a preset threshold specified for the network switches, S1 reports the port error code fault of the port 1 to the SNC. Before S1 reports a fault parameter, S2 also reports a fault parameter to the SNC because a port error code rate of a port 2 exceeds the preset threshold. In addition, before S1 reports the fault parameter of the port 1, the error code rate of the port 2 of S2, set in the SNC, does not meet a preset condition that an error code rate exceeds 10%. S1 reports the fault parameter to the SNC, and a forwarding path related to the port 1 of S1 is also related to the port 2 of S2. Therefore, if the SNC finds that after S1 reports the fault parameter, a sum of the port error code rate of the port 1 of S1 and the port error code rate of the port 2 of S2 is greater than 10% in the preset condition, the SNC determines that a path S1-S2-S3-S4 on which the port 1 and the port 2 are located, needs to be torn down, and that a new path needs to be established. For example, a port 3 of S1 is connected to a port 4 of S4 at the same time, and the SNC can create a path S1-S4 from the port 3 of S1 to the port 4 of S4. Certainly, the new path may be another path, provided that a to-be-forwarded packet does not pass a path on which the port 1 of S1 and the port 2 of S2 are located. Specifically, when the path is being torn down, control information indicating deleting a flow entry can be delivered to S1, S2, S3, and S4; when reestablishing the path, a flow entry of a reestablished path can be delivered to S1 and S4.

For the second implementation manner, for example, the forwarding path may have a primary path and a backup path. When a total degradation value of ports on the primary path that passes through the faulty port is greater than the preset threshold, the SNC can send a switch message to the forwarding device. The message carries a switchover marker, to instruct the port of the forwarding device to switch from the primary path to the backup path. The backup path may be calculated and stored in the forwarding device in advance, or the SNC calculates path information of the backup path when determining that the preset condition is met. In this case, the switch message includes not only the switchover marker but also the path information of the backup path.

Further and certainly, if a fault is rectified, the controller can receive another notification message sent by the forwarding device by using the southbound interface between the controller and the forwarding device. The another notification message includes a fault parameter, indicating that the fault is rectified, of the forwarding device. The fault parameter includes a fault location of the rectified fault, and the fault location includes a device identifier and a port identifier of the rectified fault. The another notification message may also include a fault status, and the fault status is fault rectified. Then, according to the fault parameter indicating that the fault is rectified, the controller deletes the fault parameter, stored in the controller, of the degraded port. That is, after detecting the fault and notifying the fault to the SNC, if the fault is rectified, the network switch still needs to report fault rectification to the SNC, so that the SNC deletes the previously stored fault parameter.

For example, when a single-fiber fault occurs on a port 1 of a network switch 1, because the fault is rectified by means of manual intervention, the network switch 1 needs to notify fault rectification to the SNC, so that the SNC takes the port 1 of the network switch 1 into consideration when establishing a path. For another example, a port error code is generated on a port 2 of the network switch 1, and an error code rate is relatively high. After the fault parameter is notified to the SNC, and the switch rectifies the fault by means of error detection and correction or the like, the switch also needs to notify fault rectification to the SNC. After receiving a notification message indicating the fault rectification, the SNC deletes the fault parameter indicated by the notification message.

Figure 4:
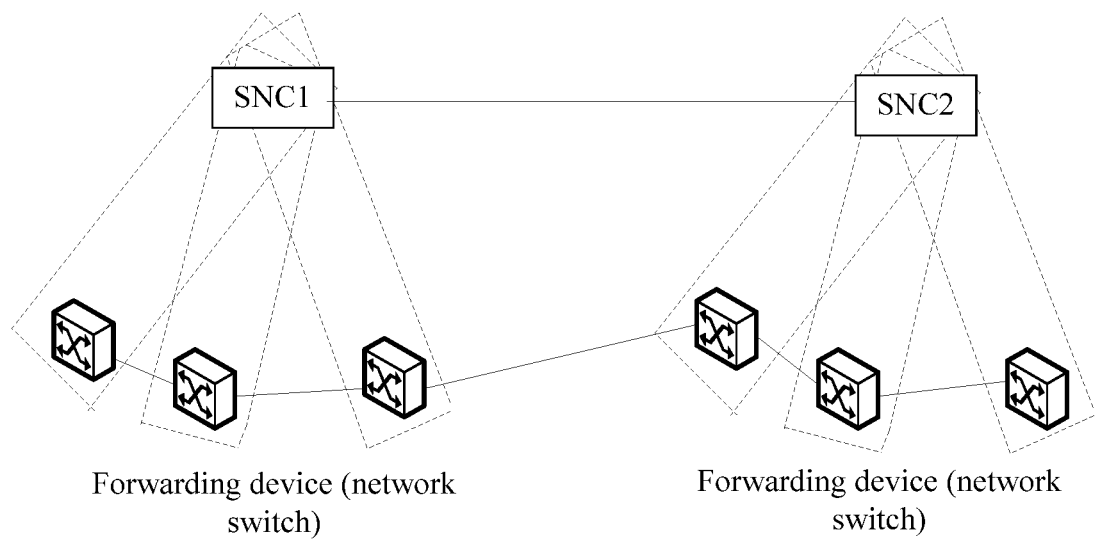
FIG. 4 is a schematic diagram of a packet forwarding path in an SDN network.

In addition, as shown in FIG. 4, in an SDN network architecture, there may be multiple SNCs, and each SNC corresponds to multiple forwarding devices configured for forwarding. When a packet is forwarded to a destination device, the packet may pass not only forwarding devices controlled by one SNC but pass forwarding devices of at least two controllers, for forwarding. Therefore, a fault parameter of a faulty forwarding device needs to be notified to the other SNCs by the SNC to which the faulty forwarding device belongs. That is, after receiving the fault parameter sent by the forwarding device, the SNC needs to notify the fault parameter to the other SNCs separately. After any one of the other SNCs receives the fault parameter, if the forwarding path is to pass forwarding devices of two SNCs, when determining that the fault parameter meets a particular preset condition, the any SNC needs to reestablish, with reference to the fault parameter currently stored in the SNC and a received fault parameter of another SNC, a forwarding path that passes through the forwarding devices of the multiple SNCs, and then send the new forwarding path to a forwarding device related to the new forwarding path. Certainly, the fault parameter that is notified to the other SNCs may be a parameter of a rectified fault, so that the other SNCs store the previously deleted and currently rectified fault parameter.

Figure 5:
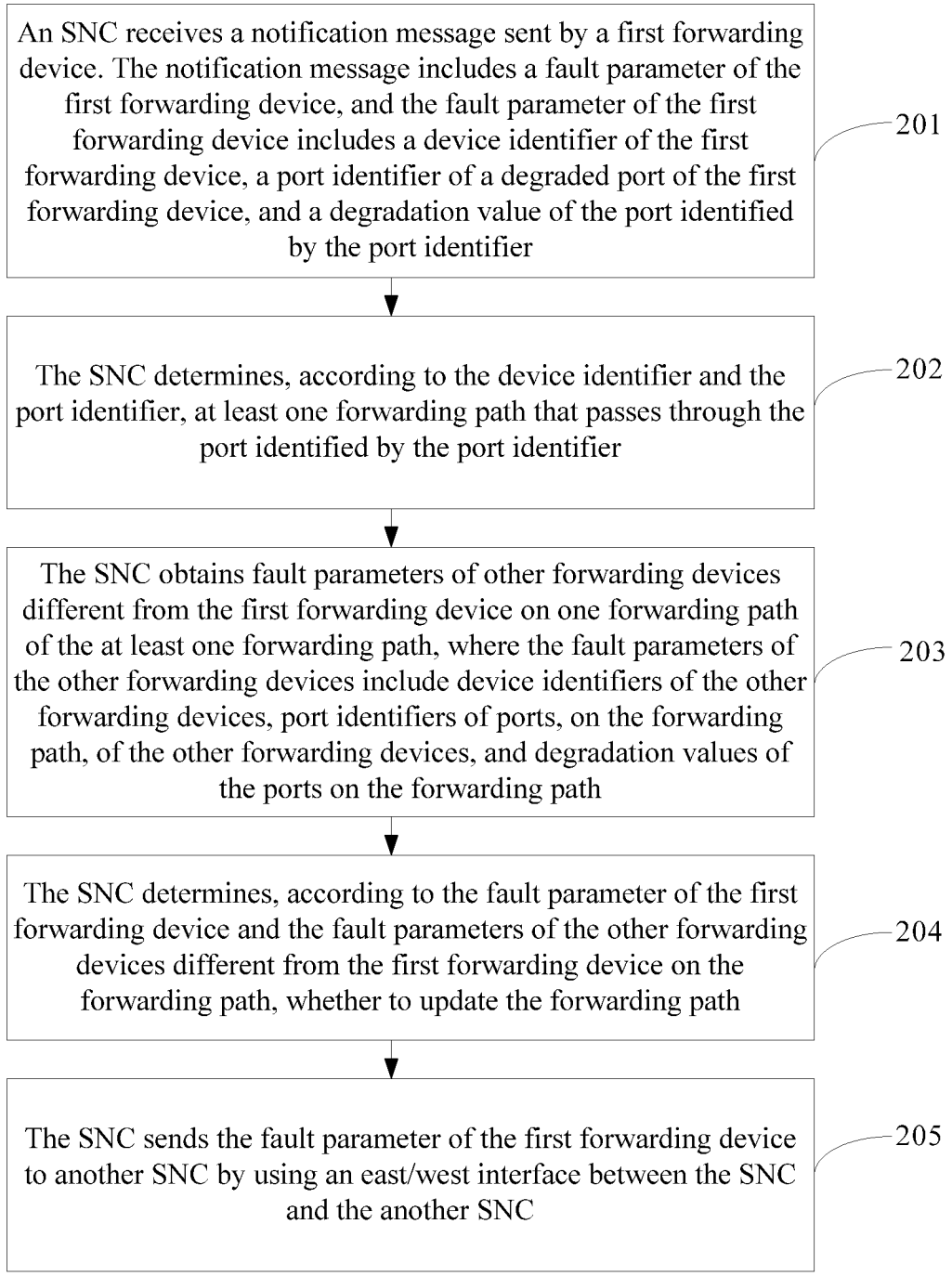
FIG. 5 is a schematic flowchart of another fault information transfer method according to an embodiment of the present invention.

In this way, based on step 204, as shown in FIG. 5, this embodiment of the present invention further includes the following step.

205: The SNC sends the fault parameter of the first forwarding device to other SNCs by using an east/west interface between the SNC and the other SNCs.

Because transferring a fault parameter between SNCs is a coordination work on the control plane, when one SNC sends a fault parameter to another SNC, the SNC needs to send the fault parameter to the another SNC by using an east/west interface.

Figure 6:
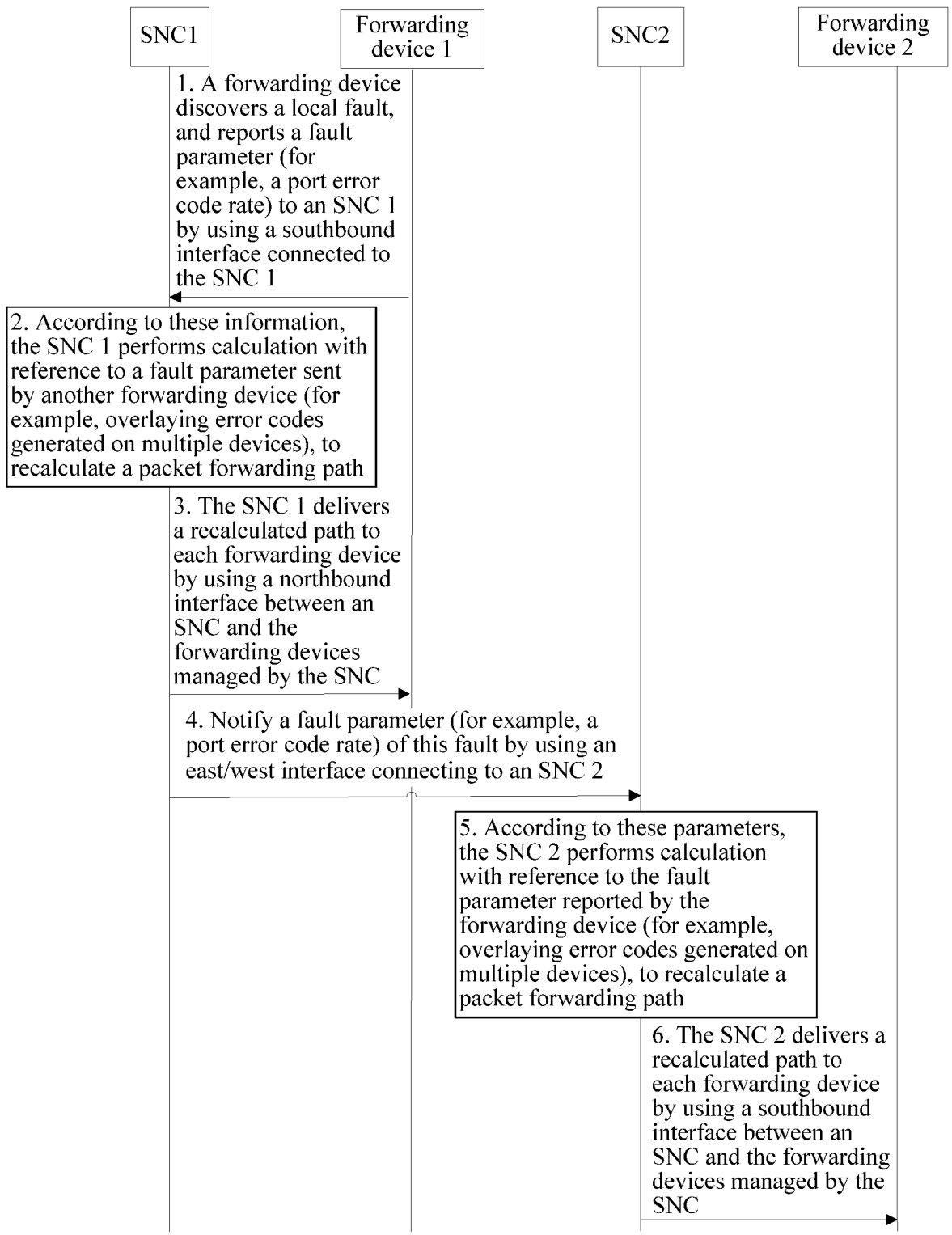
FIG. 6 is a schematic diagram of a signal flow direction in a fault information transfer method according to an embodiment of the present invention.

Two SNCs, an SNC 1 and an SNC 2, a forwarding device 1 of the SNC 1, and a forwarding device 2 of the SNC 2 are used as an example. There may be multiple forwarding devices 1 and multiple forwarding devices 2. As known from step 201 to step 204, a diagram of a signal flow among the SNC 1, the SNC 2, the forwarding device 1, and the forwarding device 2 may be shown in FIG. 6.

This embodiment of the present invention provides a method for processing a forwarding device fault. An SNC receives a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier; determines, according to the device identifier and the port identifier, at least one forwarding path that passes through the port identified by the port identifier; and obtains fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The controller determines, according to the fault parameter of the first forwarding device and the fault parameters of the other forwarding devices different from the first forwarding device on the forwarding path, whether to update the forwarding path. In this way, instead of transferring fault information between forwarding devices in a conventional way, fault information of the forwarding device is notified to the controller, so that the controller calculates an updated forwarding path. This can resolve a problem of low efficiency in recalculating a forwarding path because transferring a fault by the forwarding device causes transfer of fault information to be time consuming.

Figure 7:
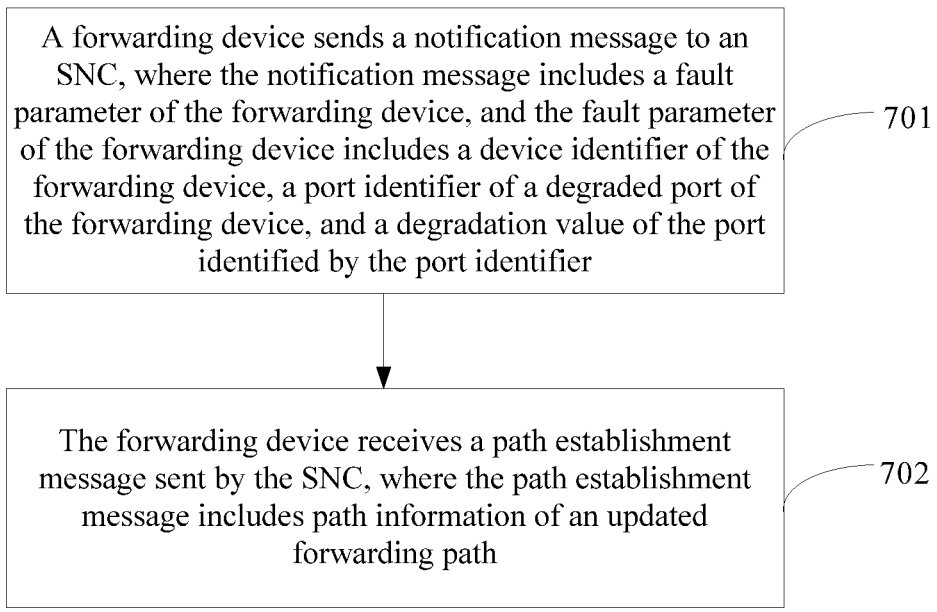
FIG. 7 is a schematic flowchart of still another fault information transfer method according to an embodiment of the present invention.

Corresponding to the embodiment shown in FIG. 2, an embodiment of the present invention further provides a method for processing a forwarding device fault. As shown in FIG. 7, the method includes the following steps.

701: A forwarding device sends a notification message to an SNC, where the notification message includes a fault parameter of the forwarding device, and the fault parameter of the forwarding device includes a device identifier of the forwarding device, a port identifier of a degraded port of the forwarding device, and a degradation value of the port identified by the port identifier.

702: The forwarding device receives a path establishment message sent by the SNC, where the path establishment message includes path information of an updated forwarding path.

Specifically, when detecting a local fault, the forwarding device sends a notification message to the SNC by using a southbound interface between the forwarding device and the SNC. The notification message includes the fault parameter of the forwarding device, and the notification message may be an asynchronous message in an OpenFlow protocol. The notification message includes a TLV with a type value of 35, and the TLV includes the fault parameter of the forwarding device.

In addition, when detecting that the fault is rectified, the forwarding device sends another notification message to the SNC. The another notification message is used to instruct the controller to delete the previously saved fault parameter.

For a specific implementation manner of the forwarding device and the SNC in this embodiment of the present invention, refer to the implementation manners shown in FIG. 2 to FIG. 6. Details are not described herein again.

This embodiment of the present invention provides a method for processing a forwarding device fault. A forwarding device sends a notification message to an SNC. The notification message includes a fault parameter of the forwarding device. The fault parameter of the forwarding device includes a device identifier of the forwarding device, a port identifier of a degraded port of the forwarding device, and a degradation value of the port identified by the port identifier. Then, the forwarding device receives a path establishment message sent by the SNC. The path establishment message includes path information of an updated forwarding path. In this way, a conventional technology in which a fault parameter is transferred between forwarding devices is not used, but instead, the fault parameter of the forwarding device is notified to the SNC, so that the controller calculates a new forwarding path. This can resolve a problem of low efficiency in recalculating a forwarding path because transferring a fault by the forwarding device causes transfer of fault information to be time consuming.

Figure 8:
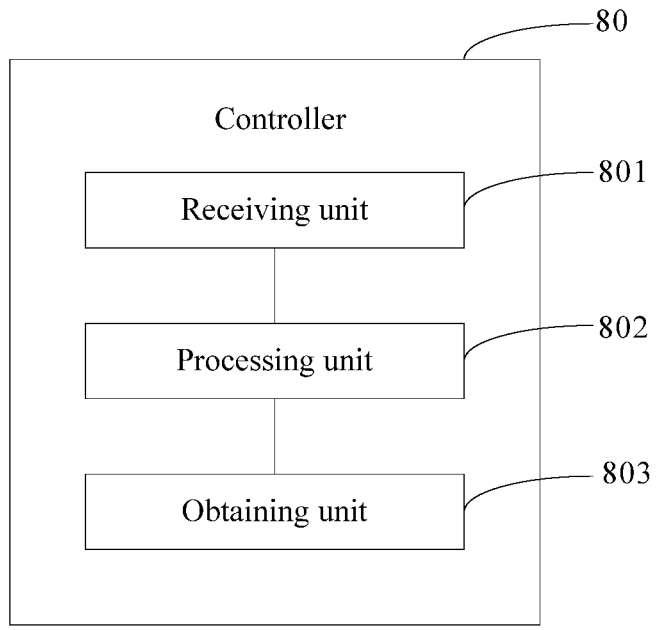
FIG. 8 is a schematic structural diagram of a controller according to an embodiment of the present invention.

An embodiment of the present invention further provides a controller 80, as shown in FIG. 8, including: a receiving unit 801, configured to receive a notification message sent by a first forwarding device. The notification message includes a fault parameter of the first forwarding device, and the fault parameter of the first forwarding device includes a device identifier of the first forwarding device, a port identifier of a degraded port of the first forwarding device, and a degradation value of the port identified by the port identifier; a processing unit 802, configured to determine, according to the device identifier and the port identifier, at least one forwarding path that passes through the port identified by the port identifier; and an obtaining unit 803, configured to obtain fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path.

The processing unit 802 is further configured to determine, according to the fault parameter of the first forwarding device and the fault parameters of the other forwarding devices different from the first forwarding device on the forwarding path, whether to update the forwarding path.

Optionally, the receiving unit 801 may be configured to: receive the notification message sent by the first forwarding device by using a southbound interface between the controller and the forwarding device.

The processing unit 802 may be configured to: calculate, a total degradation value of ports on the forwarding path according to the degradation value of the port identified by the port identifier of the first forwarding device and the degradation values of the ports, on the forwarding path, of the other forwarding devices; and update the forwarding path if the total degradation value of the ports on the forwarding path is greater than a preset threshold.

Optionally, the processing unit 802 may be configured to: calculate an updated first forwarding path, tear down the first forwarding path, and establish the updated first forwarding path; or replace the first forwarding path with a backup path of the first forwarding path.

Optionally, a sending unit 804 may be further included, and is configured to send the fault parameter to another SNC by using an east/west interface between the controller and the another SNC.

Optionally, the notification message is an asynchronous message in an OpenFlow OpenFlow protocol. The notification message includes a type-length-value TLV with a type value of 35, and the TLV includes the fault parameter of the first forwarding device.

This embodiment of the present invention provides a controller SNC. The SNC receives a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier; determines, according to the device identifier and the port identifier, at least one forwarding path that passes through the port identified by the port identifier; and obtains fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The controller determines, according to the fault parameter of the first forwarding device and the fault parameters of the other forwarding devices different from the first forwarding device on the forwarding path, whether to update the forwarding path. In this way, instead of transferring fault information between forwarding devices in a conventional way, fault information of the forwarding device is notified to the controller, so that the controller calculates an updated forwarding path. This can resolve a problem of low efficiency in recalculating a forwarding path because transferring a fault by the forwarding device causes transfer of fault information to be time consuming.

Figure 9:
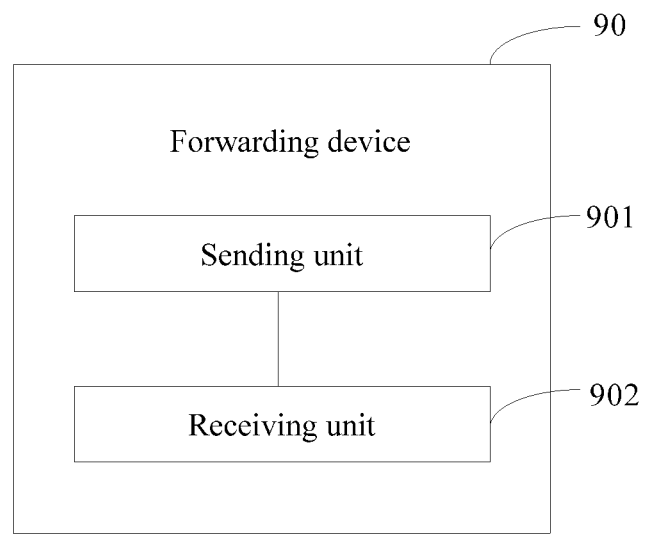
FIG. 9 is a schematic structural diagram of a forwarding device according to an embodiment of the present invention.

An embodiment of the present invention further provides a forwarding device 90, as shown in FIG. 9, including: a sending unit 901, configured to send a notification message to a software-defined networking SDN controller SNC, where the notification message includes a fault parameter of the forwarding device, and the fault parameter of the forwarding device includes a device identifier of the forwarding device, a port identifier of a degraded port of the forwarding device, and a degradation value of the port identified by the port identifier; and a receiving unit 902, configured to receive a path establishment message sent by the SNC, where the path establishment message includes path information of an updated forwarding path.

Optionally, the sending unit 901 may be configured to: send the notification message to the SNC by using a southbound interface between the forwarding device and the SNC.

Optionally, the sending unit 901 may be further configured to: send another notification message to the SNC when the forwarding device detects that a fault is rectified, where the another notification message is used to instruct the SNC to delete the fault parameter.

Optionally, the notification message is an asynchronous message in an OpenFlow OpenFlow protocol. The notification message includes a type-length-value TLV with a type value of 35, and the TLV includes the fault parameter of the forwarding device.

This embodiment of the present invention provides a forwarding device. The forwarding device sends a notification message to an SNC. The notification message includes a fault parameter of the forwarding device. The fault parameter of the forwarding device includes a device identifier of the forwarding device, a port identifier of a degraded port of the forwarding device, and a degradation value of the port identified by the port identifier. Then, the forwarding device receives a path establishment message sent by the SNC. The path establishment message includes path information of an updated forwarding path. In this way, a conventional technology in which a fault parameter is transferred between forwarding devices is not used, but instead, the fault parameter of the forwarding device is notified to the SNC, so that the controller calculates a new forwarding path. This can resolve a problem of low efficiency in recalculating a forwarding path because transferring a fault by the forwarding device causes transfer of fault information to be time consuming.

Figure 10:
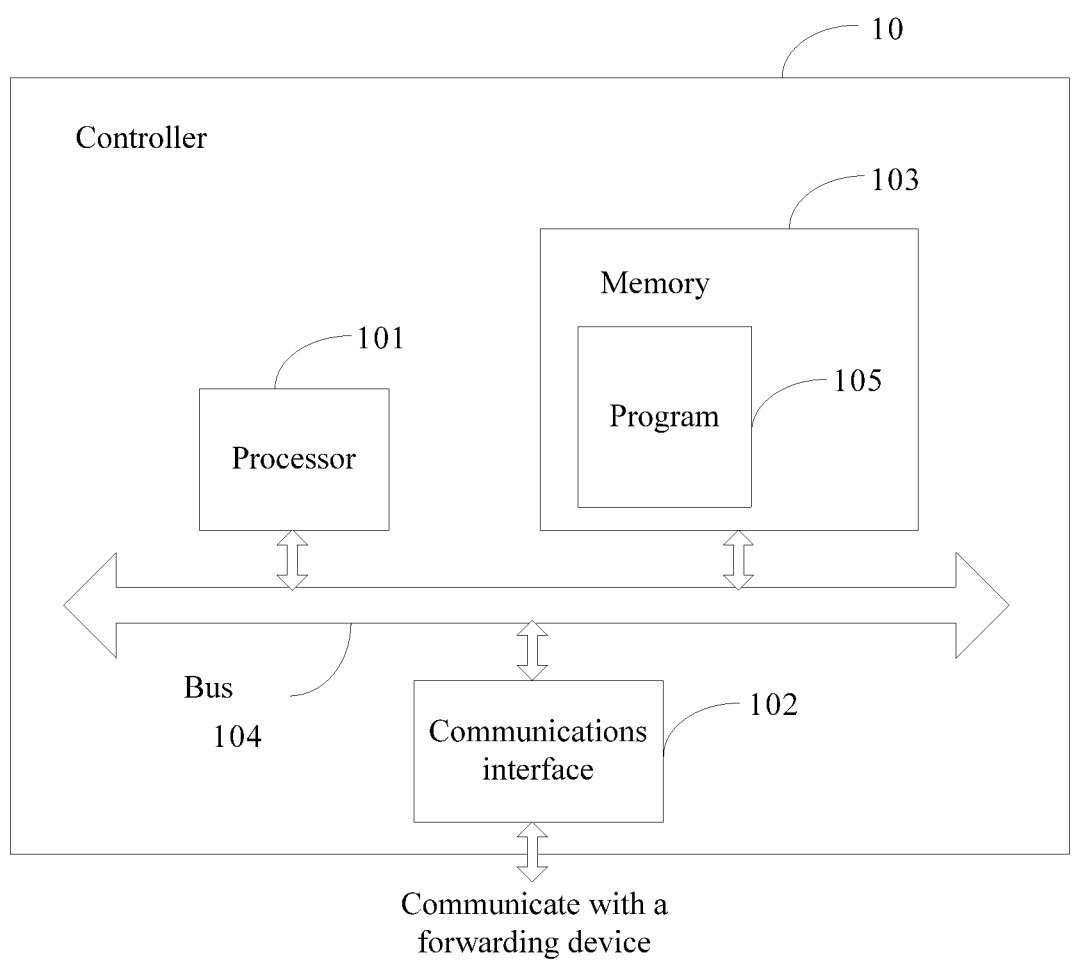
FIG. 10 is a schematic structural diagram of a controller according to an embodiment of the present invention.

An embodiment of the present invention further provides a controller SNC 10. FIG. 10 is a schematic structural diagram of the SNC. The embodiment of the present invention does not limit specific implementation of the SNC. The SNC may include: a processor 101, a communications interface 102, a memory 103, and a bus 104.

The processor 101, the communications interface 102, and the memory 103 are connected by using the bus 104.

The communications interface 102 is configured to communicate with a forwarding device, for example, communicate with a network switch.

The processor 101 is configured to execute program code, so as to execute relevant steps in the method embodiment shown in FIG. 2 and FIG. 5.

The processor 101 may be a central processing unit (CPU).

The memory 103 is configured to store a program 105. The memory 103 may include a volatile memory, for example, a random access memory (RAM). The memory 103 may also include a non-volatile memory, for example, a read-only memory (ROM), a flash memory, a hard disk drive, or a solid-state drive (SSD). The memory 103 may alternatively include a combination of the foregoing types of memories. The program 105 may specifically include: receiving a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier; determining, according to the device identifier and the port identifier, at least one forwarding path that passes through the port identified by the port identifier; obtaining fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path; and determining, according to the fault parameter of the first forwarding device and the fault parameters of the other forwarding devices different from the first forwarding device on the forwarding path, whether to update the forwarding path.

In this embodiment of the present invention, optionally, that the program 105 executes determining, according to the fault parameter of the first forwarding device and the fault parameters of the other forwarding devices different from the first forwarding device on the forwarding path, whether to update the forwarding path may include: calculating, a total degradation value of ports on the forwarding path according to the degradation value of the port identified by the port identifier of the first forwarding device and the degradation values of the ports, on the forwarding path, of the other forwarding devices; and updating the first forwarding path if the total degradation value of the ports on the forwarding path is greater than a preset threshold.

In this embodiment of the present invention, optionally, that the program 105 executes updating the first forwarding path may include: calculating an updated first forwarding path, tearing down the first forwarding path, and establishing the updated first forwarding path; or replacing the first forwarding path with a backup path of the first forwarding path.

In this embodiment of the present invention, optionally, the notification message is an asynchronous message in an OpenFlow protocol. The notification message includes a type-length-value TLV with a type value of 35, and the TLV includes the fault parameter of the first forwarding device.

This embodiment of the present invention provides an SNC. The SNC receives a notification message sent by a first forwarding device, where the notification message includes a fault parameter of the first forwarding device, and the fault parameter of the first forwarding device includes a device identifier of the first forwarding device, a port identifier of a degraded port of the first forwarding device, and a degradation value of the port identified by the port identifier; determines, according to the device identifier and the port identifier, at least one forwarding path that passes through the port identified by the port identifier; and obtains fault parameters of other forwarding devices different from the first forwarding device on one forwarding path of the at least one forwarding path, where the fault parameters of the other forwarding devices include device identifiers of the other forwarding devices, port identifiers of ports, on the forwarding path, of the other forwarding devices, and degradation values of the ports on the forwarding path. The controller determines, according to the fault parameter of the first forwarding device and the fault parameters of the other forwarding devices different from the first forwarding device on the forwarding path, whether to update the forwarding path. In this way, instead of transferring fault information between forwarding devices in a conventional way, fault information of the forwarding device is notified to the controller, so that the controller calculates an updated forwarding path. This can resolve a problem of low efficiency in recalculating a forwarding path because transferring a fault by the forwarding device causes transfer of fault information to be time consuming.

Figure 11:
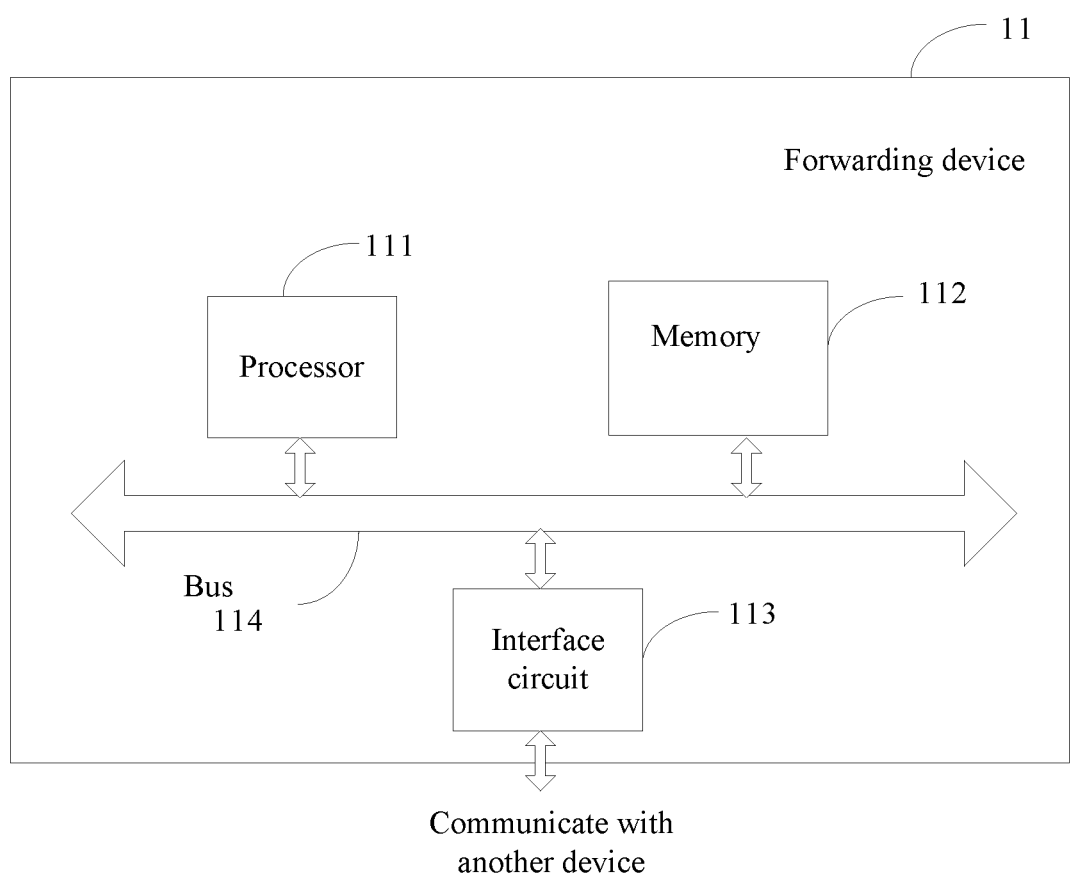
FIG. 11 is a schematic structural diagram of a forwarding device according to an embodiment of the present invention.

An embodiment of the present invention provides a software-defined networking SDN forwarding device 11. The forwarding device may be a network switch. FIG. 11 is a schematic structural diagram of the forwarding device. The network switch is used as an example for description. The network switch may include a processor 111, a memory 112, an interface circuit 113, and a bus 114 connecting the processor, the memory, and the interface circuit.

The processor 111 may be a central processing unit (English: a central processing unit CPU). The memory is configured to store running configurations, flow tables, and the like. The interface circuit is an internal circuit of ports of the network switch.

Therefore, in this embodiment of the present invention, if a port is faulty, the CPU can send a notification message to an SNC by applying an OpenFlow protocol and by using a port connected to the SNC, where the notification message includes a fault parameter of the forwarding device, and the fault parameter of the forwarding device includes a device identifier of the forwarding device, a port identifier of a degraded port of the forwarding device, and a degradation value of the port identified by the port identifier; and receives a path establishment message sent by the SNC, where the path establishment message includes path information of an updated forwarding path.

In this embodiment of the present invention, optionally, the notification message is an asynchronous message in the OpenFlow protocol. The notification message includes a type-length-value TLV with a type value of 35, and the TLV includes the fault parameter of the forwarding device.

This embodiment of the present invention provides a forwarding device. The forwarding device sends a notification message to an SNC. The notification message includes a fault parameter of the forwarding device. The fault parameter of the forwarding device includes a device identifier of the forwarding device, a port identifier of a degraded port of the forwarding device, and a degradation value of the port identified by the port identifier. Then, the forwarding device receives a path establishment message sent by the SNC. The path establishment message includes path information of an updated forwarding path. In this way, a conventional technology in which a fault parameter is transferred between forwarding devices is not used, but instead, the fault parameter of the forwarding device is notified to the SNC, so that the SNC calculates a new forwarding path. This can resolve a problem of low efficiency in recalculating a forwarding path because transferring a fault by the forwarding device causes transfer of fault information to be time consuming.

In the several embodiments provided in this application, it should be understood that the disclosed device and method may be implemented in other manners. For example, the described device embodiments are merely for illustrative purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or another forms.

All or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a USSB flash drive, a hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprising:
    receiving, by a software-defined networking controller (SNC), a notification message sent by a first forwarding device, wherein the notification message comprises a fault parameter of the first forwarding device, and the fault parameter of the first forwarding device comprises a device identifier of the first forwarding device, a port identifier of a degraded port of the first forwarding device, and a degradation value of the degraded port identified by the port identifier;
    determining, by the SNC according to the device identifier of the first forwarding device and the port identifier of the degraded port of the first forwarding device, at least one forwarding path that passes through the degraded port identified by the port identifier;
    obtaining, by the SNC, a fault parameter of another forwarding device different from the first forwarding device on a forwarding path of the at least one forwarding path, wherein the fault parameter of the another forwarding device comprise device identifier of the another forwarding device, a port identifier of a first port, on the forwarding path, of the another forwarding device, and a degradation value of the first port on the forwarding path;
    determining, by the SNC according to the fault parameter of the first forwarding device and the fault parameter of the another forwarding device, whether to update the forwarding path; and
    in response to determining to update the forwarding path, updating, by the SNC, the forwarding path, wherein updating the forwarding path comprises sending a path establishment message to the first forwarding device, wherein the path establishment message comprises information of an updated forwarding path.

2. The method according to claim 1, wherein determining, by the SNC according to the fault parameter of the first forwarding device and the fault parameter of the another forwarding device, whether to update the forwarding path comprises:
    calculating, by the SNC, a total degradation value of ports on the forwarding path according to the degradation value of the degraded port identified by the port identifier of the first forwarding device and the degradation value of the first port, on the forwarding path, of the another forwarding device; and
    determining, by the SNC, to update the forwarding path in response to the total degradation value of the ports on the forwarding path being greater than a preset threshold.

3. The method according to claim 1, wherein updating, by the SNC, the forwarding path comprises:
    calculating, by the SNC, the updated forwarding path, tearing down the forwarding path, and establishing the updated forwarding path.

4. The method according to claim 1, wherein updating, by the SNC, the forwarding path further comprises:
    replacing, by the SNC, the forwarding path with a backup path of the forwarding path.

5. A software-defined networking controller (SNC), comprising:
- a processor; and
- a communications interface; and
- wherein the processor is configured to:
  - receive a notification message sent by a first forwarding device by using the communications interface, wherein the notification message comprises a fault parameter of the first forwarding device, and the fault parameter of the first forwarding device comprises a device identifier of the first forwarding device, a port identifier of a degraded port of the first forwarding device, and a degradation value of the degraded port identified by the port identifier;
  - determine, according to the device identifier and the port identifier of the degraded port, at least one forwarding path that passes through the degraded port identified by the port identifier;
  - obtain a fault parameter of another forwarding device different from the first forwarding device on a forwarding path of the at least one forwarding path, wherein the fault parameter of the another forwarding device comprises a device identifier of the another forwarding device, a port identifier of a first port, on the forwarding path, of the another forwarding device, and a degradation value of the first port on the forwarding path;
  - determine, according to the fault parameter of the first forwarding device and the fault parameter of the another forwarding device different from the first forwarding device on the forwarding path, whether to update the forwarding path; and
  - in response to determining to update the forwarding path, update the forwarding path, wherein updating the forwarding path comprises sending a path establishment message to the first forwarding device, wherein the path establishment message comprises information of an updated forwarding path.

6. The SNC according to claim/wherein the processor is further configured to:
- calculate a total degradation value of ports on the forwarding path according to the degradation value of the degraded port identified by the port identifier of the first forwarding device and the degradation value of the first port, on the forwarding path, of the another forwarding device; and
- update the forwarding path in response to the total degradation value of the ports on the forwarding path being greater than a preset threshold.

7. The SNC according to claim 5, wherein the processor is configured to:
- calculate the updated forwarding path, tear down the forwarding path, and establish the updated forwarding path.

8. The SNC according to claim 5, wherein the processor is configured to:
- replace the forwarding path with a backup path of the forwarding path.

9. The SNC according to claim 5, wherein the notification message is an asynchronous message in an OpenFlow protocol, the notification message comprises a type-length-value (TLV) with a type value of 35, and the TLV comprises the fault parameter of the first forwarding device.

10. A communications system, comprising:
- a software-defined networking controller (SNC); and
- a forwarding device;
- wherein the SNC is configured to:
  - receive a notification message sent by the forwarding device, wherein the notification message comprises a fault parameter of the forwarding device, and the fault parameter of the forwarding device comprises a device identifier of the forwarding device, a port identifier of a degraded port of the forwarding device, and a degradation value of the degraded port identified by the port identifier;
  - determine, according to the device identifier and the port identifier, at least one forwarding path that passes through the degraded port identified by the port identifier; and
  - obtain a fault parameter of another forwarding device different from the forwarding device on a forwarding path of the at least one forwarding path, wherein the fault parameter of the another forwarding device comprises a device identifier of the another forwarding device, a port identifier of a first port, on the forwarding path, of the another forwarding device, and a degradation value of the first port on the forwarding path; and
  - determine, according to the fault parameter of the forwarding device and the fault parameter of the another forwarding device different from the forwarding device on the forwarding path, whether to update the forwarding path;
  - in response to determining to update the forwarding path, update the forwarding path, wherein updating the forwarding path comprises sending a path establishment message to the forwarding device, wherein the path establishment message comprises information of an updated forwarding path; and
- wherein the forwarding device is configured to:
  - send the notification message to the SNC, wherein the notification message comprises the fault parameter of the forwarding device; and
  - receive the path establishment message sent by the SNC.

11. The communications system according to claim 10, wherein the SNC is further configured to:
- calculate a total degradation value of ports on the forwarding path according to the degradation value of the port identified by the port identifier of the forwarding device and the degradation value of the first port, on the forwarding path, of the another forwarding device; and
- update the forwarding path in response to the total degradation value of the ports on the forwarding path being greater than a preset threshold.

12. The system according to claim 10, wherein the SNC is further configured to:
- calculate the updated forwarding path, tear down the forwarding path, and establish the updated forwarding path.

13. The system according to claim 10, wherein the SNC is further configured to:
- replace the forwarding path with a backup path of the forwarding path.

14. The system according to claim 10, wherein the notification message is an asynchronous message in an OpenFlow protocol, the notification message comprises a type-length-value (TLV) with a type value of 35, and the TLV comprises the fault parameter of the forwarding device.

15. The system according to claim 10, wherein the SNC is further configured to:
- send the path establishment message to another forwarding device on the updated forwarding path; and send the fault parameter of the forwarding device to another SNC.

16. The system according to claim 10, wherein the SNC being configured to determine, according to the fault parameter of the forwarding device and the fault parameter of the another forwarding device different from the forwarding device on the forwarding path, whether to update the forwarding path, comprises the SNC being configured to:
   overlay the degradation value of the forwarding device and the degradation value of the another forwarding device, to obtain an overlaid degradation value; and
   determine, according to overlaid degradation value, whether to update the forwarding path.

* * * * *

UNITED STATES PATENT AND TRADEMARK OFFICE
CERTIFICATE OF CORRECTION

PATENT NO. : 11,496,355 B2
APPLICATION NO. : 16/931708
DATED : November 8, 2022
INVENTOR(S) : Zhongyu Wang et al.

It is certified that error appears in the above-identified patent and that said Letters Patent is hereby corrected as shown below:

In the Claims

Claim 6, Column 17, Line 40; delete "claim/wherein" and insert --claim 5, wherein--.

Signed and Sealed this
Twenty-seventh Day of December, 2022

Katherine Kelly Vidal
*Director of the United States Patent and Trademark Office*